United States Patent
McColloch et al.

(10) Patent No.: US 10,063,316 B2
(45) Date of Patent: Aug. 28, 2018

(54) WALL PLATE HAVING A BUILT-IN MODEM FOR PERFORMING ELECTRICAL-TO-OPTICAL CONVERSION, OPTICAL-TO-ELECTRICAL CONVERSION AND PROTOCOL-TO-PROTOCOL CONVERSION

(71) Applicant: NanoPrecision Products, Inc., El Segundo, CA (US)

(72) Inventors: Laurence R. McColloch, Santa Clara, CA (US); Michael K. Barnoski, Pacific Palisades, CA (US); Robert R. Vallance, Newbury Park, CA (US); Shuhe Li, Pasadena, CA (US)

(73) Assignee: NANOPRECISION PRODUCTS, INC., El Segundo, CA (US)

( * ) Notice: Subject to any disclaimer, the term of this patent is extended or adjusted under 35 U.S.C. 154(b) by 148 days.

(21) Appl. No.: 15/143,525

(22) Filed: Apr. 30, 2016

(65) Prior Publication Data

US 2017/0317752 A1  Nov. 2, 2017

(51) Int. Cl.
*H04B 10/00* (2013.01)
*H04B 10/25* (2013.01)
(Continued)

(52) U.S. Cl.
CPC ......... *H04B 10/2503* (2013.01); *G02B 6/426* (2013.01); *G02B 6/428* (2013.01);
(Continued)

(58) Field of Classification Search
CPC ............ H04B 10/2503; H04B 10/2504; H04B 10/1143; H04B 10/27; H04B 10/25;
(Continued)

(56) References Cited

U.S. PATENT DOCUMENTS

| 5,241,410 | A | * | 8/1993 | Streck | ................ | H04B 10/1149 |
|           |   |   |        |        |                 | 398/115      |
| D456,239  | S | * | 4/2002 | Luu    | ...............  | D14/242      |

(Continued)

OTHER PUBLICATIONS

"Stride Media Converter", eCM-32 Communication Products, Book 1 (14.1), Apr. 16, 2014.

*Primary Examiner* — Hibret Woldekidan
(74) *Attorney, Agent, or Firm* — Liu & Liu (57) ABSTRACT

A wall plate is provided having a built-in modem on the backside of the wall plate that performs O/E, E/O and protocol conversions. The backside of the wall plate has an optical port for connecting an end of an optical fiber cable to the wall plate. A printed circuit board (PCB) disposed on the backside of the wall plate has electrical circuitry mounted thereon that performs protocol conversion and communicates with an optical transceiver module also mounted on the PCB. The optical transceiver module receives optical signals transmitted to the customer premises and transmits optical signals from the customer premises and performs O/E and E/O conversion. A front face of the wall plate has at least one socket therein for connection with an electrical connector disposed on an end of an electrical cable. The wall plate does not require a separate power supply.

22 Claims, 7 Drawing Sheets

(51) Int. Cl.
　　　*H04B 10/27*　　　(2013.01)
　　　*G02B 6/42*　　　(2006.01)
(52) U.S. Cl.
　　　CPC ......... *G02B 6/4284* (2013.01); *G02B 6/4292* (2013.01); *H04B 10/27* (2013.01)
(58) Field of Classification Search
　　　CPC .. H04B 10/40; H04B 10/114; H04B 10/2575; H04B 1/38; H04B 2203/5445; H04J 14/0227; G02B 6/426; G02B 6/428; G02B 6/4284; G02B 6/4292; G02B 6/4293; G02B 6/4245
　　　USPC ... 398/71, 72, 115, 135, 138, 139, 164, 116, 398/117
　　　See application file for complete search history.

(56)　　　　　　　References Cited

U.S. PATENT DOCUMENTS

| | | | | |
|---|---|---|---|---|
| 6,498,294 | B1 * | 12/2002 | Kuwahara | G02B 6/4277 174/549 |
| 7,330,661 | B1 * | 2/2008 | Jackson | H04B 10/1149 370/310 |
| 8,085,802 | B1 * | 12/2011 | Monk | H04L 5/0046 370/419 |
| 8,155,526 | B2 * | 4/2012 | Gray | H04J 14/0245 370/463 |
| 8,187,644 | B2 * | 5/2012 | Addington | A61K 36/24 424/725 |
| 8,401,387 | B2 | 3/2013 | Biegert et al. | |
| 8,480,310 | B2 * | 7/2013 | Kewitsch | G02B 6/3825 385/55 |
| 8,631,450 | B1 * | 1/2014 | Bernath | H04L 12/2801 725/119 |
| 8,891,544 | B1 * | 11/2014 | Monk | H04L 5/0046 370/351 |
| 8,958,697 | B2 | 2/2015 | Soto et al. | |
| 9,172,993 | B2 * | 10/2015 | Monk | H04L 12/2801 |
| 9,565,469 | B2 * | 2/2017 | Monk | H04L 12/2801 |
| 9,857,542 | B2 * | 1/2018 | McColloch | G02B 6/4246 |
| 2007/0121924 | A1 * | 5/2007 | Hermans | H04M 19/08 379/399.02 |
| 2008/0013909 | A1 * | 1/2008 | Kostet | G02B 6/3851 385/135 |
| 2008/0019642 | A1 * | 1/2008 | Kewitsch | G02B 6/3825 385/72 |
| 2011/0026934 | A1 * | 2/2011 | Boyd | H04B 10/58 398/156 |
| 2011/0044693 | A1 * | 2/2011 | Kelly | H04B 10/40 398/116 |
| 2012/0128081 | A1 * | 5/2012 | Hikihara | H04B 3/54 375/257 |
| 2013/0011143 | A1 * | 1/2013 | Binder | H04B 3/542 398/115 |
| 2015/0050022 | A1 | 2/2015 | Loredo, Jr. et al. | |
| 2016/0231515 | A1 * | 8/2016 | Byun | G02B 6/3893 |
| 2017/0150207 | A1 * | 5/2017 | Monk | H04N 21/43615 |

* cited by examiner

WALL PLATE HAVING A BUILT-IN MODEM FOR PERFORMING ELECTRICAL-TO-OPTICAL CONVERSION, OPTICAL-TO-ELECTRICAL CONVERSION AND PROTOCOL-TO-PROTOCOL CONVERSION

FIELD OF THE INVENTION

The invention relates to wall plates, and more particularly, to a wall plate having a built-in modem for performing electrical-to-optical (E/O), optical-to-electrical (O/E) and protocol conversion.

BACKGROUND

Optical networks are used to deliver data, voice and video services to multiple network subscribers using one or more optical fibers. The optical networks that are used to deliver the data, voice and video services may be either passive or active. In a passive optical network (PON), passive optical components such as optical combiners and splitters enable multiple subscribers to share the same optical fiber. Thus, the PON functions as a point-to-multipoint optical network. A PON may conform to any of a variety of PON standards, including, for example, gigabit-capable PON (GPON) (ITU G.984), gigabit-capable Ethernet PON (GEPON) (IEEE 802.3) and broadband PON (BPON) (ITU G.983). In an active optical network, electrically-powered equipment, such as switches, routers, and multiplexer, is used to distribute the signal to the subscriber premises. Thus, an active optical network, such as an active Ethernet optical network, operates as a point-to-point network.

Within these various types of optical networks, various schemes are used to deliver the optical signals to the subscriber premises, including, for example, fiber to the node/neighborhood ("FTTN"), fiber to the curb ("FTTC"), fiber to the building ("FTTB"), fiber to the home ("FTTH"), fiber to the premises ("FTTP"), or other location to which a fiber network extends. An optical network terminal (OTN), which is typically mounted on the outside of the customer premises, performs O/E conversion of signals being transmitted downstream to the customer premises and E/O conversion of signals being transmitted upstream from the customer premises to the optical network. Typically a wall plate has a front face with at least one electrical port to allow the customer to plug an electrical cable into the port to connect customer devices to the electrical port via telephone cables, data cables and/or radio frequency (RF) video cables.

The backside of the wall plate has electrical contacts that are connected by electrical wiring to the OTN. The OTN typically includes an uninterruptible power supply for powering the electrical circuitry of the OTN. An installer typically installs the OTN on an outside wall of the customer premises and runs electrical wiring to connect electrical contacts on the backside of the wall plate to electrical contacts of the OTN. In some cases, the premises already has the electrical wiring running from the backside of the wall plate to a location outside of the premises so that the installed does not have to run the wires.

Alternately, the optical signal is brought to the premise with an optical connector on the wall plate and the customer is required to connect an optical cable from the wall plate to their modem, in which case the modem is a separate box that must be positioned somewhere in the room and powered, usually by plugging into a wall outlet.

It would be desirable to eliminate the need for an externally-mounted OTN and the tasks associated with running electrical wires from the backside of the wall plate to the OTN. It would also be desirable to eliminate the need for a separate power supply. It would also be desirable to provide a wall plate that can directly connect to an end of an optical fiber cable of the optical network. It would also be desirable to eliminate the need for a separate modem box and its need for a connection to a wall plug.

BRIEF DESCRIPTION OF THE FIGURES

Many aspects of the invention can be better understood by referring to the following description in conjunction with the accompanying claims and figures. Like numerals indicate like structural elements and features in the various figures. For clarity, not every element may be labeled with numerals in every figure. The drawings are not necessarily drawn to scale, emphasis instead being placed upon illustrating the principles of the invention. The drawings should not be interpreted as limiting the scope of the invention to the example embodiments shown herein.

WRITTEN DESCRIPTION

Throughout this description, embodiments and variations are described for the purpose of illustrating uses and implementations of inventive concepts. The illustrative description should be understood as presenting examples of inventive concepts, rather than as limiting the scope of the concept as disclosed herein. It should be further understood that certain words and terms are used herein solely for convenience and such words and terms should be interpreted as referring to various objects and actions that are generally understood in various forms and equivalencies by persons of ordinary skill in the art. It should also be understood that the word "example," as used herein, is intended to be non-exclusionary and non-limiting in nature. More particularly, the word "exemplary" as used herein indicates one among several examples, and it must be understood that no undue emphasis or preference is being directed to the particular example being described.

In terms of a general overview, a wall plate is provided having a built-in modem on the backside of the wall plate that performs O/E, E/O and protocol conversions. The backside of the wall plate has an optical port for connecting an end of an optical fiber cable to the wall plate. A printed circuit board (PCB) disposed on the backside of the wall plate has electrical circuitry mounted thereon that performs protocol conversion and communicates with an optical transceiver module also mounted on the PCB. The optical transceiver module receives optical signals transmitted to the customer premises and transmits optical signals from the customer premises and performs O/E and E/O conversion. A front face of the wall plate has at least one socket therein for connection with an electrical connector disposed on an end of an electrical cable. The socket may be, for example, a Universal Serial Bus (USB) socket or an Ethernet socket. The front face of the wall plate may have two different types of sockets therein, e.g., a USB socket and an Ethernet sock. The wall plate does not require a separate power supply. An exemplary embodiment of the wall plate will now be described with reference to the figures.

Figure 1A:
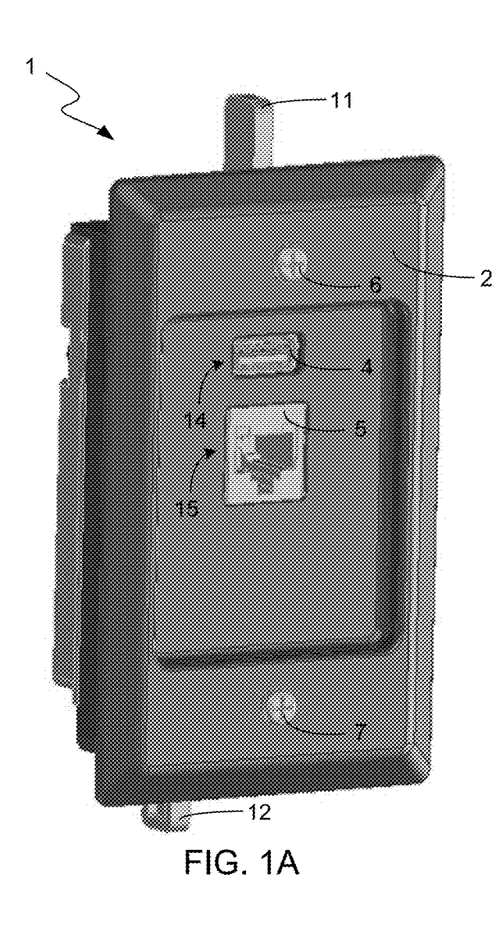
FIGS. 1A and 1B illustrate front and back perspective views, respectively, of a wall plate in accordance with an exemplary embodiment.
Figure 1B:
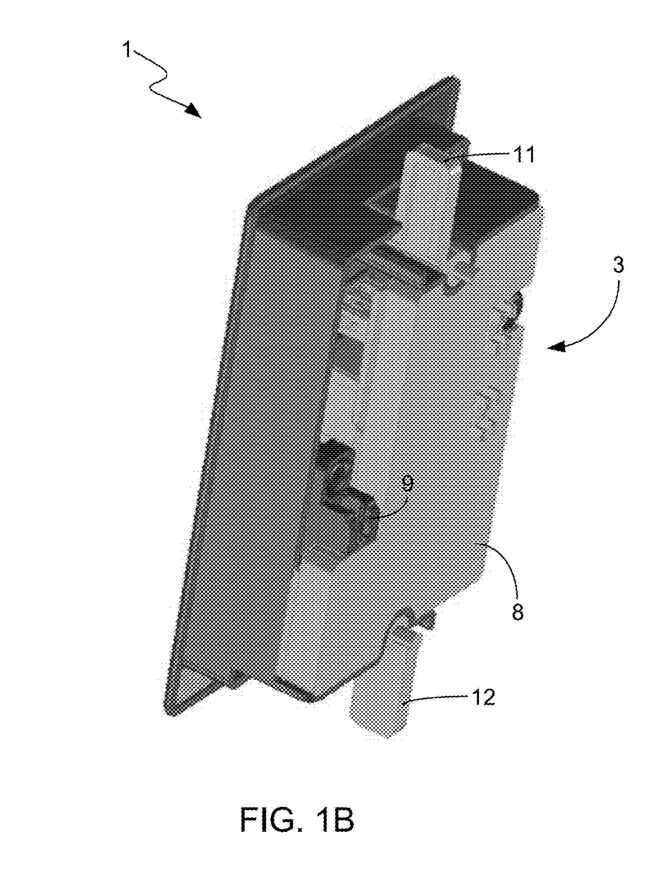

FIGS. 1A and 1B illustrate front and back perspective views, respectively, of the wall plate 1 in accordance with an exemplary embodiment. The wall plate 1 has a front face 2 and a backside 3. In accordance with this embodiment, the front face 2 has first and second electrical ports 4 and 5, respectively, formed therein. First and second screws 6 and 7, respectively, are used to secure the wall plate 1 to a wall (not shown), as will be described below in more detail. The backside 3 of the wall plate 1 has a cover 8 secured thereto, as will be described below in more detail. The cover 8 is configured to leave an optical port 9 exposed for connection to an optical fiber cable (not shown) even when the cover 8 is secured to the backside 3 of the wall plate 1.

The wall plate 1 has first and second locking devices 11 and 12 that lock the wall plate 1 to a wall (not shown) when the first and second screws 6 and 7 are tightened, respectively, as will be described below in more detail. The arrangement of the screws 6 and 7 and the locking devices 11 and 12 is a conventional arrangement used in conventional wall plate designs to secure wall plates to walls. The wall plate 1 may have a form factor that is different (e.g., larger) that the form factor of a conventional wall plate.

Figure 2:
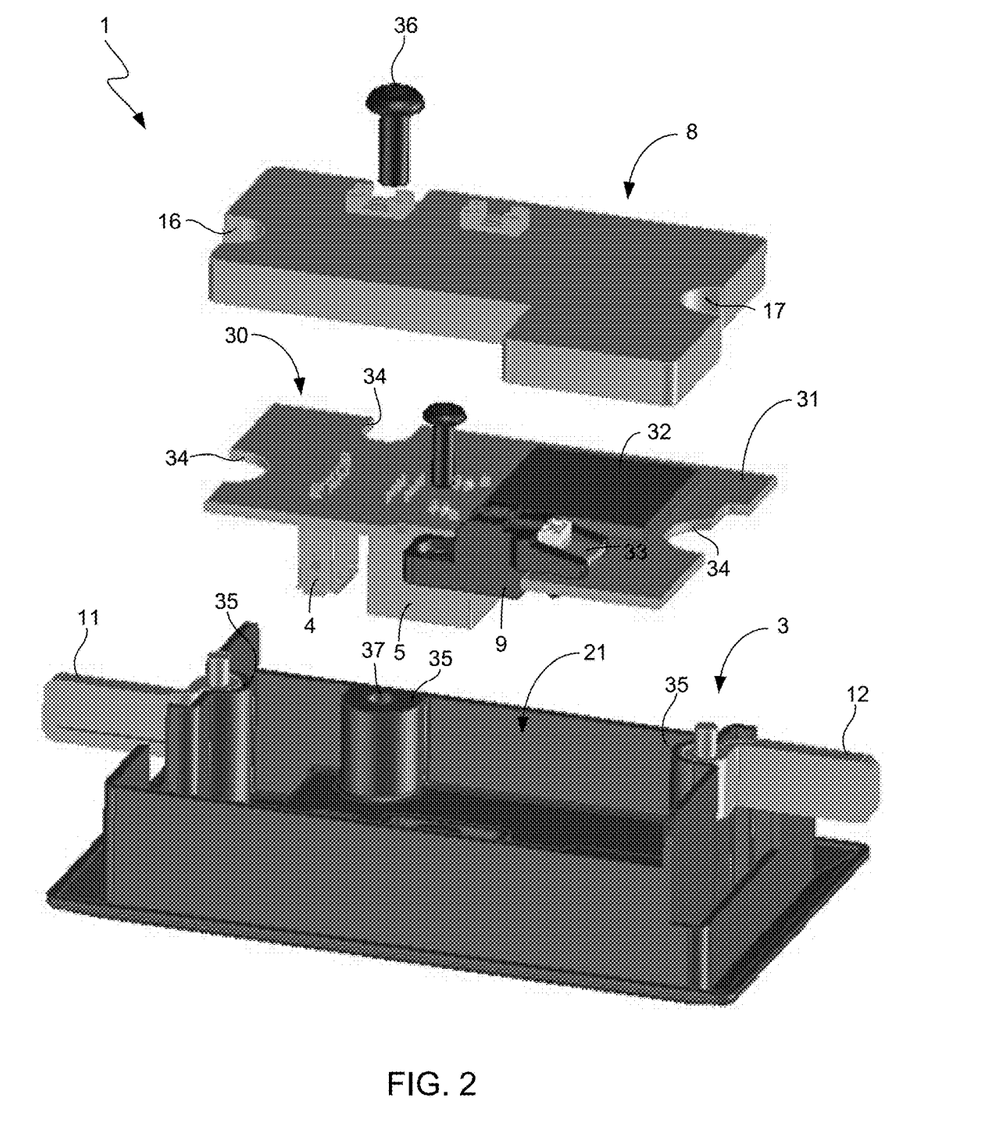
FIG. 2 illustrates an exploded perspective view of the wall plate shown in FIG. 1.

FIG. 2 illustrates an exploded perspective view of the wall plate 1 shown in FIG. 1. The backside 3 of the wall plate 1 has a compartment 21 formed therein that is used for storing a modem 30. The modem 30 includes a PCB 31, at least one integrated circuit (IC) chip 32 mounted on the PCB 31, an optical transceiver module 33 mounted on the PCB 31 and mechanically coupled with the optical port 9, and the first and second electrical ports 4 and 5, respectively, mechanically and electrically coupled with the PCB 31. When the modem 30 is placed inside of the compartment 21 with the orientation shown in FIG. 2, the first and second electrical ports 4 and 5 extend through first and second openings 14 and 15 (FIG. 1A), respectively. The PCB 31 has cutaways 34 that are complementary in shape to features 35 inside of the compartment 21 such that the modem 30 fits snugly inside of the compartment 21, as will be described below in more detail Likewise, the cover 8 has cutaways 16 and 17 that are complementary in shape to the features 35 inside of the compartment 21 such that the cover fits snugly inside of the compartment 21. Engagement of a screw 36 with a threaded hole 37 formed in one of the features 35 secures the cover 8 tightly to the back side 3 of the wall plate 1 inside of the compartment 21.

The PCB 31 has electrically conductive traces (not shown) therein that electrically interconnect the electrical contacts (not shown) of the IC chip 32 to respective electrical contacts (not shown) of the first and second electrical ports 4 and 5. These electrical interconnections will be referred to herein as the first electrical interface. The PCB 31 has electrically conductive traces (not shown) therein that electrically interconnect the electrical contacts (not shown) of the IC chip 32 to respective electrical contacts (not shown) of the optical transceiver module 33. These electrical interconnections will be referred to herein as the second electrical interface.

Figure 3:
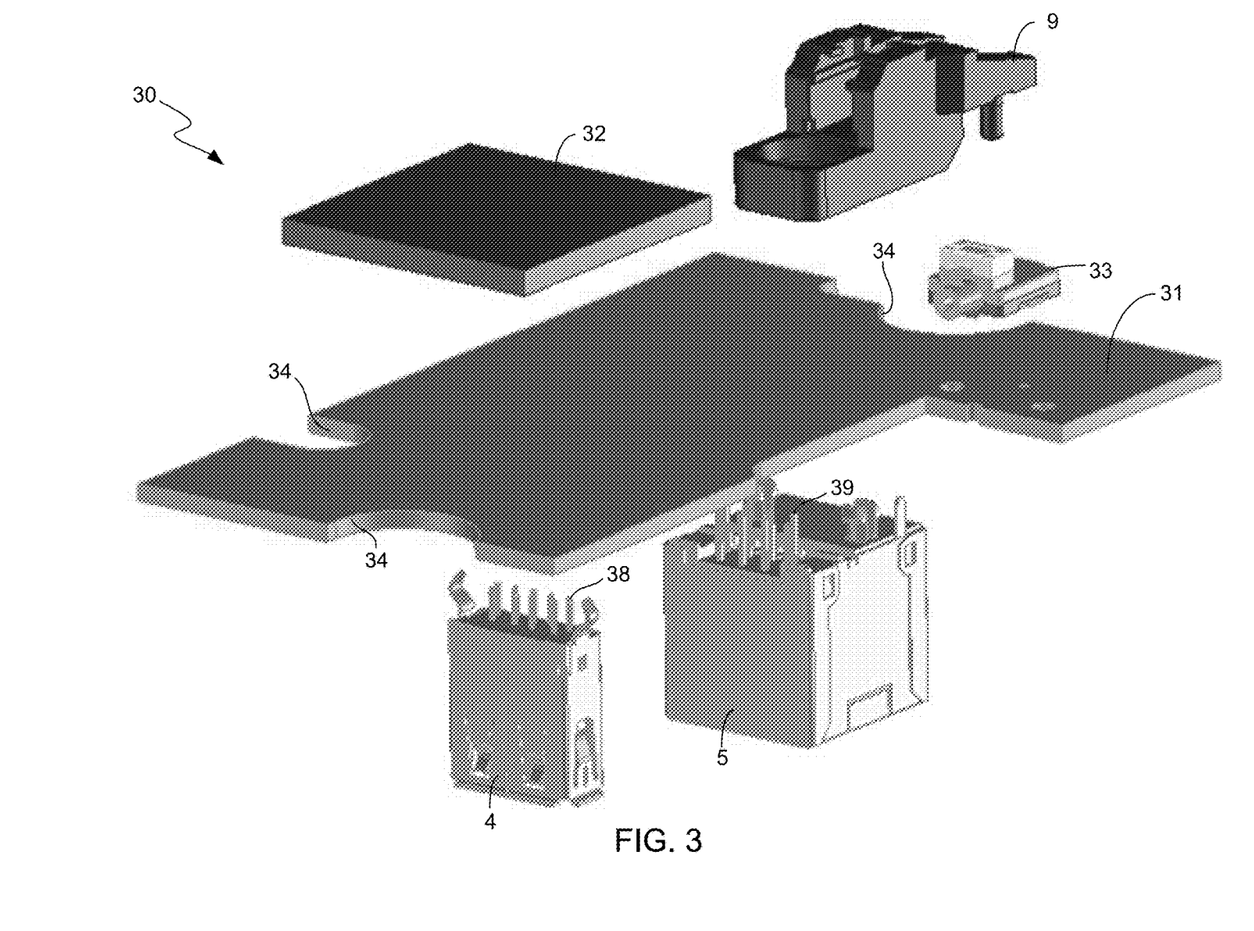
FIG. 3 illustrates an exploded view of the modem shown in FIG. 2.

FIG. 3 illustrates an exploded view of the modem 30 shown in FIG. 2. The electrical ports 4 and 5, in accordance with this exemplary embodiment, are designed and manufactured to mate with a USB connector (not shown) and an Ethernet connector (not shown), respectively. The Ethernet connector is commonly referred to as an RJ45 connector or an 8 position 8 contact (8P8C) connector. There are a variety of USB connector designs that have different form factors and/or different pinouts. For exemplary purposes, it will be assumed that the electrical port 4 is designed to mate with and electrically couple with a standard format USB connector. The electrical ports 4 and 5 have pins 38 and 39, respectively, that are inserted into the substrate of the PCB 31 and engage respective electrical contacts of the PCB 31 when the electrical ports 4 and 5 are mounted on the PCB 31 at respective preselected locations. The pins 38 and 39 are electrically interconnected by traces of the PCB 31 to respective electrical contacts of the IC chip 32.

The IC chip 32 performs signaling protocol conversion. For exemplary purposes, it will be assumed that the signals carried on the USB cable (not shown) comply with a known USB signaling protocol. The invention is not limited to any particular USB signaling protocol. For exemplary purposes, it will be assumed that the signals carried on the Ethernet cable (not shown) comply with a known Ethernet signaling protocol. The invention is not limited to any particular Ethernet signaling protocol. For exemplary purposes, it will be assumed that the signals carried on the optical fiber cable (not shown) that connects to the optical port 9 complies with a known Ethernet or PON signaling protocol. The invention is not limited to any particular PON signaling protocol.

For incoming USB signals received in USB port 4, the IC chip 32 converts the received USB signals into electrical signals that comply with the optical signaling protocol and forwards the electrical signals to the optical transceiver module 33. The optical transceiver module 33 converts the electrical signals into optical signals and couples the optical signals into the end of the optical fiber cable.

For incoming Ethernet signals received in Ethernet port 5, the IC chip 32 converts the received Ethernet signals into electrical signals that comply with the optical signaling protocol (e.g., PON or Ethernet) and forwards the electrical signals to the optical transceiver module 33. The optical transceiver module 33 converts the electrical signals into optical signals and couples the optical signals into the end of the optical fiber cable.

For optical signals passing out of the end of the optical fiber cable, the optical transceiver module 33 converts the optical signals into electrical signals and forwards the electrical signals to the IC chip 32. The IC chip 32 converts the electrical signals into the required format, such as, for example, USB or Ethernet electrical signals and forwards them to either the USB port 4 or the Ethernet port 5, which couples them onto the conductors of the respective connector.

IC chips exist that are suitable for performing the signaling protocol conversions described above. Persons of skill in the art will know how to choose a suitable IC chip for this purpose or how to have an IC chip developed that is suitable for performing the signaling protocol conversions described above. Therefore, in the interest of brevity, a detailed discussion of the manner in which the signaling protocol conversions are performed will not be described herein in further detail.

Figure 4A:
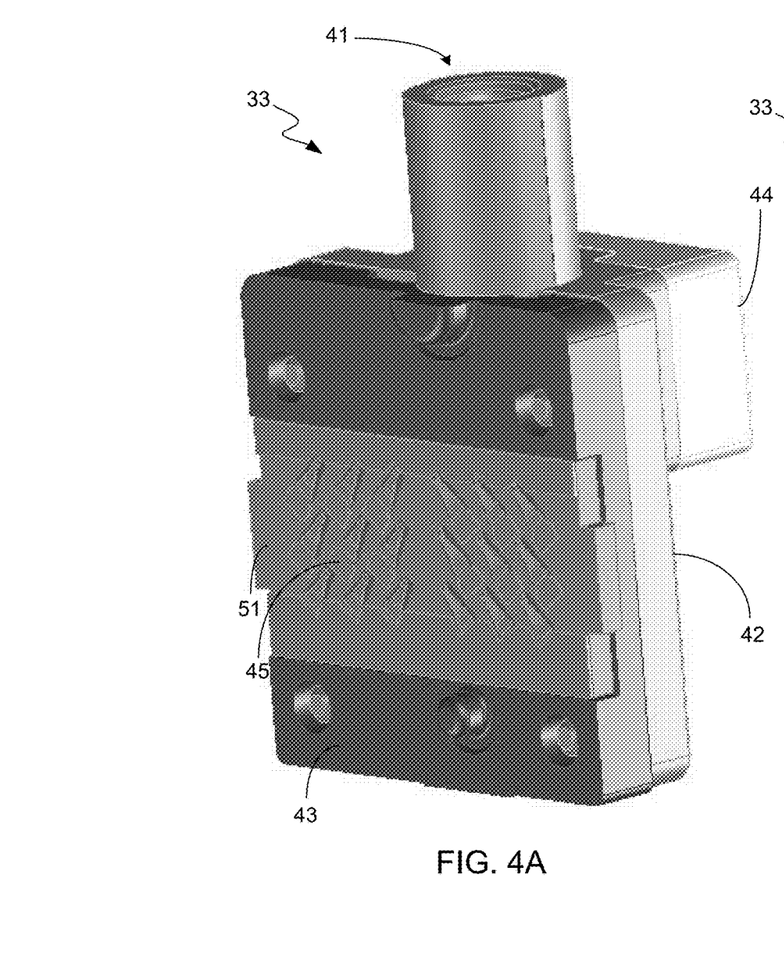
FIGS. 4A and 4B illustrate bottom and top perspective views, respectively, of the optical transceiver module shown in FIGS. 2 and 3.
Figure 4B:
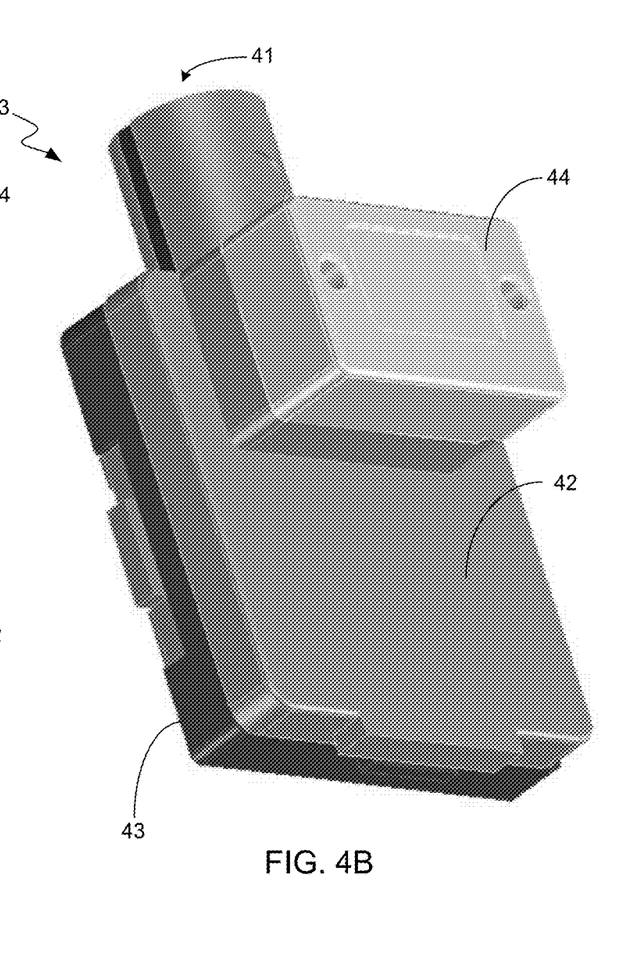

FIGS. 4A and 4B illustrate bottom and top perspective views, respectively, of the optical transceiver module 33 shown in FIGS. 2 and 3. In accordance with an exemplary embodiment, the optical transceiver 33 is a bidirectional optical transceiver module. The bidirectional optical transceiver module 33 is described in detail in U.S. application Ser. No. 14/526,320 (hereinafter "the '320 application"), filed on Oct. 28, 2014, which is assigned to the assignee of the present application, which is hereby incorporated by reference herein in its entirety, and which has been allowed. Therefore, rather than describe the bidirectional optical transceiver module 33 in detail, a general discussion of the components and operations of the module 33 will be provided herein.

The module 33 has an optical port 41 for receiving an end of an optical fiber cable (not shown), an upper body portion 42, a lower body portion 43 that is secured to the upper body portion 42 to form a module housing 44, and various components contained inside of the module housing 44, as will be described below with reference to FIG. 5. The lower surface of the lower body portion 43 has a land grid array 45 thereon. The electrical contacts of the LGA 45 make contact with respective electrical contacts of the PCB 31 when the module 33 is mounted on and secured to a preselected location of the PCB 31. The optical port 9 (FIG. 2) applies an amount of pressure against the module 33 that is needed to ensure that LGA 45 remains in good electrical contact with the electrical contacts of the PCB 31. As will be described below in more detail, the optical port 9 (FIG. 2) mates with an LC optical connector that holds the end of an optical fiber cable. The mating of the LC optical connector with the optical port 9 causes a ferrule (not shown) of the LC optical connector to mate with the optical port 41 of the module 33.

Figure 5:
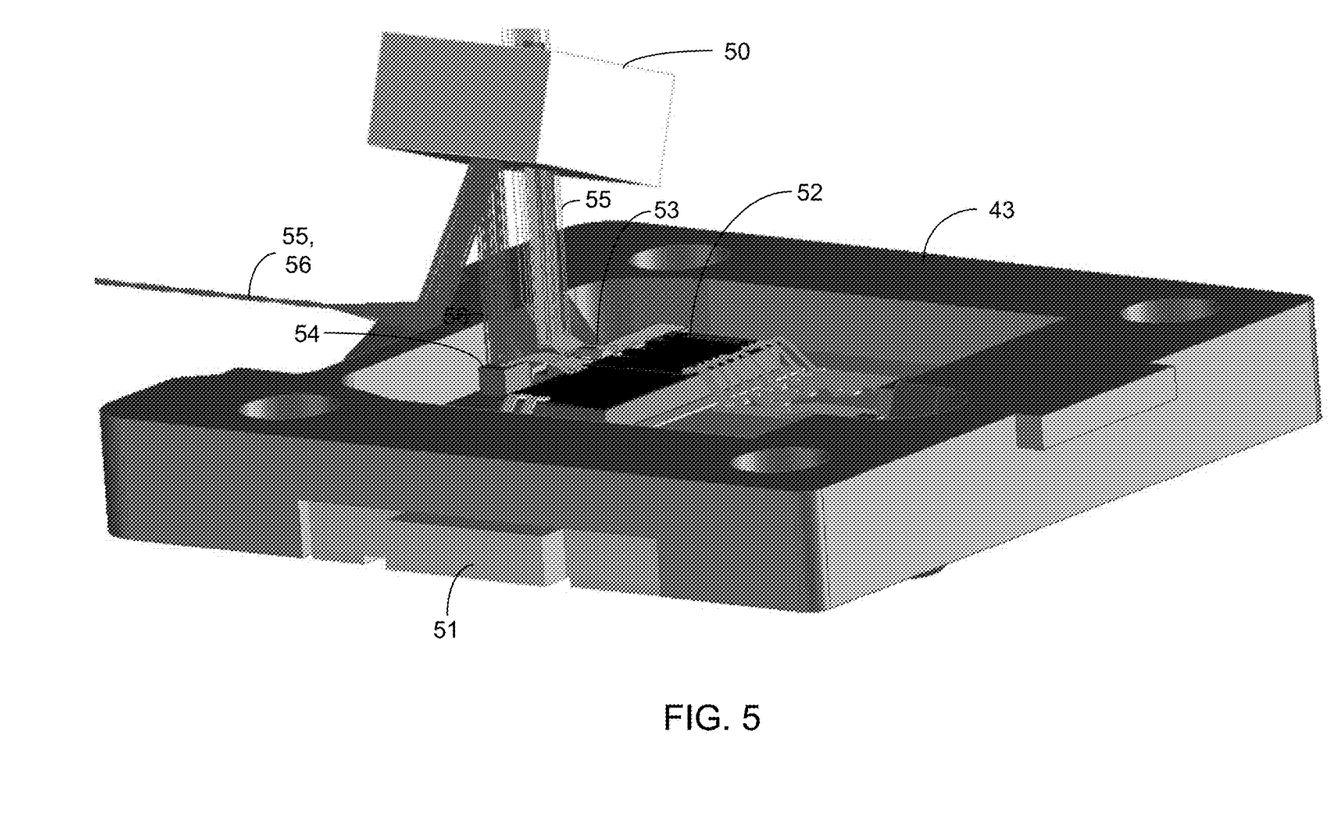
FIG. 5 illustrates a top perspective view of the lower body portion of the optical transceiver module shown in FIGS. 4A and 4B and of an optical subassembly that is held within the upper body portion.

FIG. 5 illustrates a top perspective view of the lower body portion 43 shown in FIGS. 4A and 4B and of an optical subassembly (OSA) 50 that is held within the upper body portion 42, which is not shown in FIG. 5. The lower body portion 43 has a module PCB 51 mounted thereon, the bottom surface of which has the LGA 45 thereon. The top surface of the module PCB 51 has a combined transmitter (Tx)/receiver (Rx) IC chip 52, a laser diode chip 53 and a photodiode chip 54 mounted thereon. The light pathways for the signals being received and transmitted are represented by numerals 55 and 56, respectively. The OSA 50 and the light pathways are described in detail and shown in the '320 application.

Figure 6:
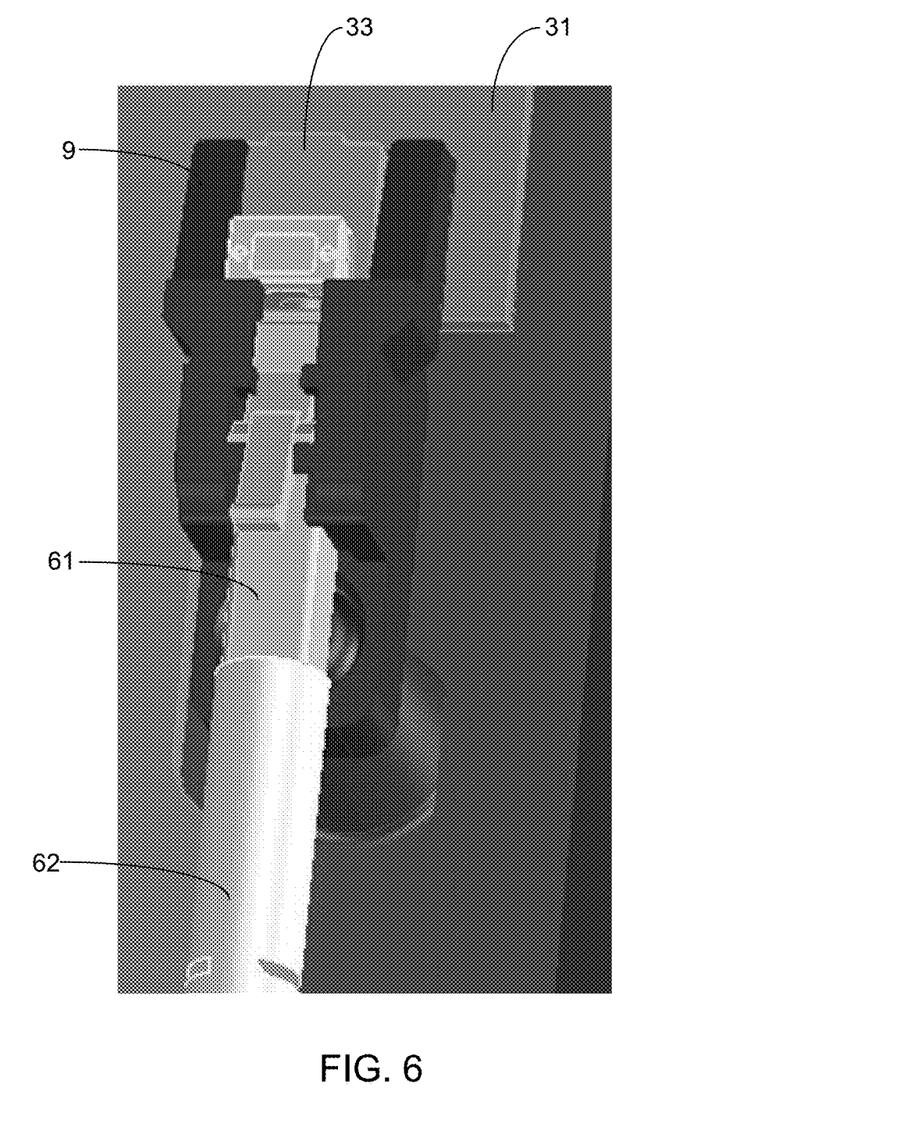
FIG. 6 illustrates a top perspective view of a portion of the backside of the wall plate that shows the manner in which the optical port of the wall plate mates with an LC optical connector and mechanically couples with the optical transceiver module.

FIG. 6 illustrates a top perspective view of a portion of the backside 3 of the wall plate 1 that shows the manner in which the optical port 9 mates with an LC optical connector 61 and mechanically couples with the optical transceiver module 33 such that the mating of the LC optical connector 61 with the optical port 9 causes a ferrule (not shown) of the LC optical connector 61 that holds an end of an optical fiber (not shown) to mate with the optical port 41 (FIGS. 4A and 4B) of the module 33. The LC optical connector 61 is disposed on an end of an optical fiber cable 62. As indicated above with reference to FIG. 1B, even when the cover 8 is secured to the wall plate 1, the optical port 9 is left exposed. This allows the LC optical connector 61 to be mated with the optical port 9.

Figure 7A:
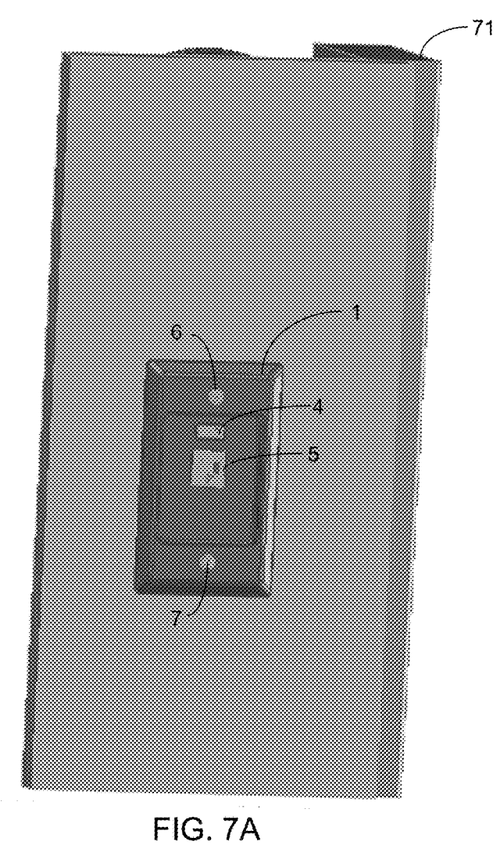
FIGS. 7A and 7B illustrate front and back perspective views, respectively, of a portion of a wall of a customer premises having the wall plate shown in FIGS. 1A and 1B secured thereto.
Figure 7B:
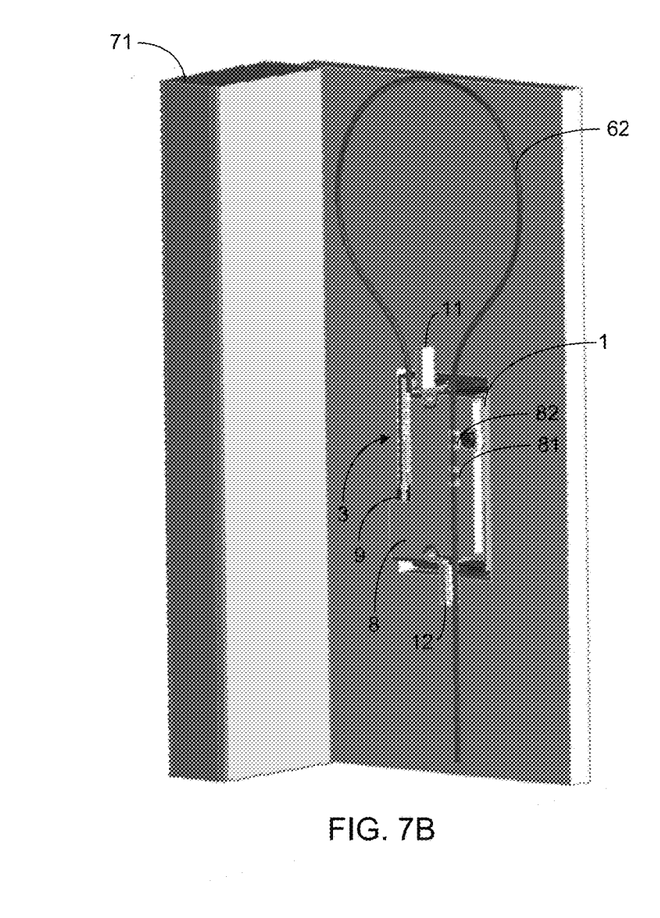

FIGS. 7A and 7B illustrate front and back perspective views, respectively, of a portion of a wall 71 of a customer premises having the wall plate 1 secured thereto. The wall plate 1 is installed in the normal manner in which conventional wall plates are installed. An opening (not shown) is cut in the dry wall that is large enough for the outer walls that define the compartment 21 to fit through the opening. The screws 6 and 7 are then tightened to cause the locking devices 11 and 12 to rotate to the positions shown in FIGS. 1A and 1B. Continued tightening of the screws 6 and 7 causes the locking devices 11 and 12 to tighten against the wall 71. In the exemplary embodiment depicted herein, the back of the cover 8 has two strain relief devices 81 and 82 thereon that grip the optical fiber cable 62 to provide strain relief. It can be seen that once the wall plate 1 has been secured to the wall 71, the optical fiber cable 62 is not accessible by the customer and is not exposed.

Another benefit of the wall plate 1 is that it does not require a separate power source. The USB or Ethernet cable that is plugged into the electrical port 4 or 5, respectively, provides electrical power to the wall plate for powering the electrical and optoelectronic components of the modem 30. For example, the Ethernet cable that is used can be compliant with the Power over Ethernet (POE) standard. Likewise, USB cables deliver electrical power. The modem uses less than 10 volts at only a few watts, which allows the wall plate 1 to easily meet Underwriting Laboratories (UL) low-voltage standard for devices that use under 30 volts. Also, because the wall plate 1 uses very little power, it generates very little heat, and only when it is being used. Any heat that is generated is dissipated within the wall plate 1, which is typically made if die cast metal. In accordance with an embodiment, the PCB 31 has one or more planar sheets of thin metal extending through it such that outer edges of the metal sheet(s) are in contact with the inner walls of the compartment 21. In this way, any heat that is generated by the modem 30 is transferred by the metal sheet(s) into the wall plate 1 where it spreads out and is dissipated. This is advantageous because there are standards in some countries that do not allow heat to be dissipated within a wall of a premise.

It should be noted that the invention has been described with reference to a few exemplary embodiments for the purpose of demonstrating principles and concepts of the invention. It will be understood by persons of skill in the art, in view of the description provided herein, that the invention is not limited to these illustrative embodiments. For example, the invention is not limited to the configuration of the wall plate 1 shown in the figures or with respect to the modem or its components used therein. The modem 30 is an example of a suitable modem for this purpose, but any modem that provides the necessary functionality described above may be used for this purpose. Also, the invention is not limited to using the optical transceiver module 33 described above having to OSA described in the '320 application. Persons of skill in the art will understand that these and other variations can be made to the illustrative embodiments without deviating from the scope of the invention.

What is claimed is:
1. A wall plate comprising:
a wall plate housing having a front face that faces an interior space of a customer premise to enable a customer to access the front face, the front face having at least a first electrical port therein that is adapted to mate with a first electrical connector disposed on an end of a first electrical communications cable, a backside of the faceplate having a compartment formed therein:

a modem disposed inside of the compartment, the modem being electrically interconnected with said at least a first electrical port, the modem having a first optical port that is adapted to mate with an optical connector disposed on an end of an optical fiber cable; and a cover secured to a backside of the wall plate opposite the front face plate such that the modem is at least partially enclosed inside of the compartment, wherein the first optical port is at least partially exposed through the wall plate to allow the optical connector to be mated with the optical port, and wherein the modem comprises:
a first circuit board, wherein the first optical port is mechanically coupled with the first circuit board, and wherein said at least a first electrical port is electrically interconnected with the first circuit board;
a first integrated circuit (IC) chip mounted on and electrically interconnected with the first circuit; and
an optical transceiver module mounted on and electrically interconnected with the first circuit board and optically coupled with the first optical port.

2. The wall plate of claim 1, wherein the first electrical port is an Ethernet port and wherein the first electrical connector is an Ethernet connector.

3. The wall plate of claim 1, wherein the first electrical port is a Universal Serial Bus (USB) port and wherein the first electrical connector is a USB connector.

4. The wall plate of claim 1, wherein the optical transceiver module is a bidirectional optical transceiver module, the optical fiber cable having a single optical fiber that over which optical signals of at least first and second wavelengths are transmitted, and wherein the optical transceiver module comprises:
an optical subassembly (OSA) that optically separates optical signals of the first and second wavelengths;
a light source capable of being driven to produce optical signals of the first wavelength;
a light detector capable of detecting optical signals of the second wavelength, converting the optical signals of the second wavelength into electrical signals, and outputting the electrical signals;
a light source driver that drives the light source to cause the light source to produce optical signals of the first wavelength; and
a receiver that receives the electrical signals outputted by the light detector.

5. The wall plate of claim 4, wherein the first optical port comprises an LC connector.

6. The wall plate of claim 1, wherein the modem is powered by electrical power received via the first electrical connector.

7. A wall plate comprising:
a wall plate housing having a front face that faces an interior space of a customer premise to enable a customer to access the front face, the front face having at least a first electrical port therein that is adapted to mate with a first electrical connector disposed on an end of a first electrical communications cable, a backside of the faceplate having a compartment formed therein:
a modem disposed inside of the compartment, the modem being electrically interconnected with said at least a first electrical port, the modem having a first optical port that is adapted to mate with an optical connector disposed on an end of an optical fiber cable; and
a cover secured to a backside of the wall plate opposite the front face plate such that the modem is at least partially enclosed inside of the compartment, wherein the first optical port is at least partially exposed through the wall plate to allow the optical connector to be mated with the optical port, and
wherein the front face plate has at least first and second electrical ports therein that are adapted to mate with first and second electrical connectors, respectively, disposed on ends of first and second electrical communications cables, respectively, and wherein the first and second electrical ports are of first and second types that are different from one another, and wherein the first and second electrical communications cables are of the first and second types, respectively, that are different from one another.

8. The wall plate of claim 7, wherein the first type is Ethernet and the second type is Universal Serial Bus (USB).

9. The wall plate of claim 7, wherein the modem is configured to convert electrical signals of a first communications protocol received in the modem via the first electrical port into electrical signals of a second communications protocol, and wherein the modem is configured to convert electrical signals of a third communications protocol received in the modem via the second electrical port into electrical signals of the second communications protocol, the modem converting optical signals of the second communications protocol received in the modem via the optical port into electrical signals of either the first or third communications protocols.

10. The wall plate of claim 9, wherein the first communications protocol is an Ethernet communications protocol, the second communications protocol is a Passive Optical Network (PON) communications protocol, and the third communications protocol is a Universal Serial Bus (USB) communications protocol.

11. The wall plate of claim 9, wherein the first communications protocol is an Ethernet communications protocol, the second communications protocol is an Ethernet communications protocol, and the third communications protocol is a Universal Serial Bus (USB) communications protocol.

12. The wall plate of claim 7, wherein the modem is powered by electrical power received via the first electrical connector.

13. A wall plate comprising:
a wall plate housing having a front face that faces an interior space of a customer premise to enable a customer to access the front face, the front face having at least a first electrical port therein that is adapted to mate with a first electrical connector disposed on an end of a first electrical communications cable, a backside of the faceplate having a compartment formed therein:
a modem disposed inside of the compartment, the modem being electrically interconnected with said at least a first electrical port, the modem having a first optical port that is adapted to mate with an optical connector disposed on an end of an optical fiber cable; and
a cover secured to a backside of the wall plate opposite the front face plate such that the modem is at least partially enclosed inside of the compartment, wherein the first optical port is at least partially exposed through the wall plate to allow the optical connector to be mated with the optical port, and
wherein the modem is configured to convert electrical signals of a first communications protocol received in the modem via the first electrical port into electrical signals of a second communications protocol, the modem converting optical signals of the second communications protocol received in the modem via the optical port into electrical signals of the first communications protocol.

14. The wall plate of claim 13, wherein the first communications protocol is an Ethernet communications protocol and wherein the second communications protocol is a Passive Optical Network (PON) communications protocol.

15. The wall plate of claim 13, wherein the first communications protocol is an Ethernet communications protocol and wherein the second communications protocol is an Ethernet communications protocol.

16. The wall plate of claim 13, wherein the first communications protocol is a Universal Serial Bus (USB) communications protocol and wherein the second communications protocol is a Passive Optical Network (PON) communications protocol.

17. The wall plate of claim 13, wherein the first communications protocol is a Universal Serial Bus (USB) communications protocol and wherein the second communications protocol is an Ethernet communications protocol.

18. The wall plate of claim 13, wherein the modem is powered by electrical power received via the first electrical connector.

19. A wall plate comprising:
a wall plate housing having a front face that faces an interior space of a customer premise to enable a customer to access the front face, the front face having at least a first and second electrical ports therein that are adapted to mate with first and second electrical connectors, respectively, disposed on an ends of first and second electrical communications cables, respectively, a backside of the wall plate having a compartment formed therein;
a modem disposed inside of the compartment, the modem being electrically interconnected with said at least a first electrical port, the modem being powered by electrical power delivered to the modem via the first or second electrical connector, the modem comprising:
a first circuit board, wherein the first optical port is mechanically coupled with the first circuit board, and wherein said at least a first electrical port is electrically interconnected with the first circuit board;
a first integrated circuit (IC) chip mounted on and electrically interconnected with the first circuit, the first IC being configured to perform signaling protocol conversion; and
a bidirectional optical transceiver module mounted on and electrically interconnected with the first circuit board and optically coupled with the first optical port, the optical transceiver module being configured to perform optical-to-electrical conversion of optical signals and electrical-to-optical conversion of electrical signals; and
a cover secured to a backside of the wall plate opposite the front face such that the modem is at least partially enclosed inside of the compartment, wherein the first optical port is at least partially exposed through the wall plate to allow the optical connector to be mated with the optical port.

20. The wall plate of claim 19, wherein the first IC chip is configured to convert electrical signals of a first communications protocol received in the modem via the first electrical port into electrical signals of a second communications protocol, and wherein the first IC chip is configured to convert electrical signals of a third communications protocol received in the modem via the second electrical port into electrical signals of the second communications protocol, the optical transceiver module converting optical signals of the second communications protocol received in the modem via the optical port into electrical signals of either the first or third communications protocols.

21. The wall plate of claim 20, wherein the first communications protocol is an Ethernet communications protocol, the second communications protocol is a Passive Optical Network (PON) communications protocol, and the third communications protocol is a Universal Serial Bus (USB) communications protocol.

22. The wall plate of claim 20, wherein the first communications protocol is an Ethernet communications protocol, the second communications protocol is an Ethernet communications protocol, and the third communications protocol is a Universal Serial Bus (USB) communications protocol.

* * * * *